No. 825,812. PATENTED JULY 10, 1906.
B. D. EMANUEL.
WEIGHING SCOOP.
APPLICATION FILED MAR. 22, 1906.

Witnesses
W. M. Gentle
N. Allemong

Inventor
Benjamin D. Emanuel.
By V. H. Lockwood
Attorney

UNITED STATES PATENT OFFICE.

BENJAMIN D. EMANUEL, OF ANDERSON, INDIANA, ASSIGNOR TO THE ANDERSON TOOL COMPANY, OF ANDERSON, INDIANA, A CORPORATION OF INDIANA.

WEIGHING-SCOOP.

No. 825,812.  Specification of Letters Patent.  Patented July 10, 1906.

Application filed March 22, 1906. Serial No. 307,385.

*To all whom it may concern:*

Be it known that I, BENJAMIN D. EMANUEL, of Anderson, county of Madison, and State of Indiana, have invented a certain new and useful Weighing-Scoop; and I do hereby declare that the following is a full, clear, and exact description thereof, reference being had to the accompanying drawings, in which like numerals refer to like parts.

The object of this invention is to simplify and adapt for practical use computing grocers' scoops and the like of the general type shown in the patents heretofore granted to Arthur L. Swank, December 12, 1905, No. 807,333 and No. 807,334, automatic weighing-scoop.

The nature of this invention will be more fully understood from the accompanying drawings and the following description and claims.

Figure 1:
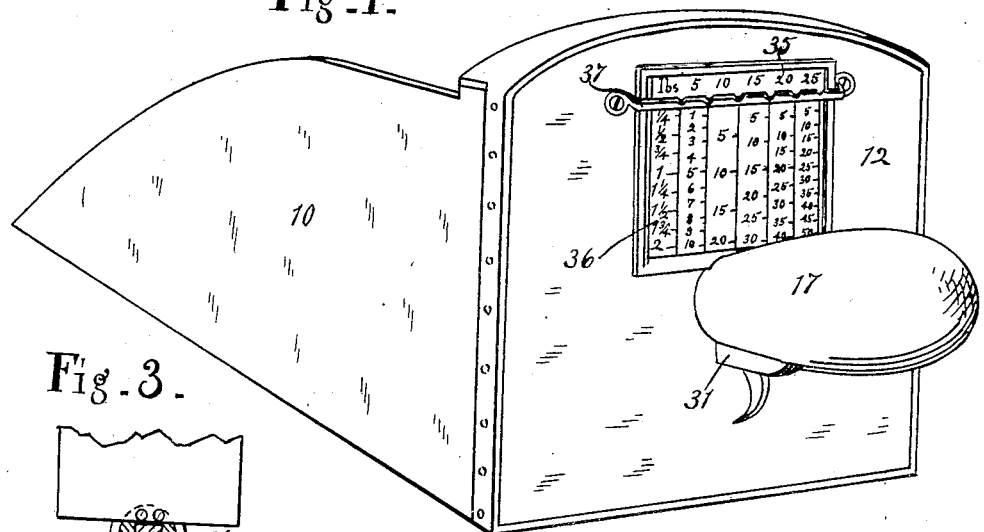
Figure 3:
Figure 2:
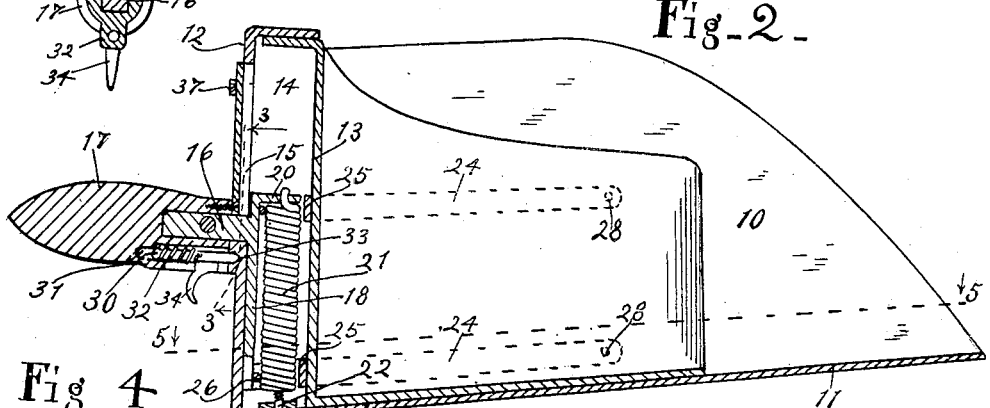
Figure 4:
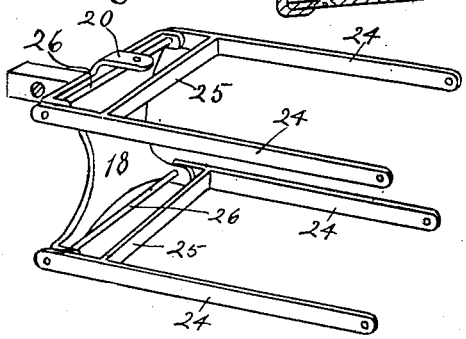
Figure 5:
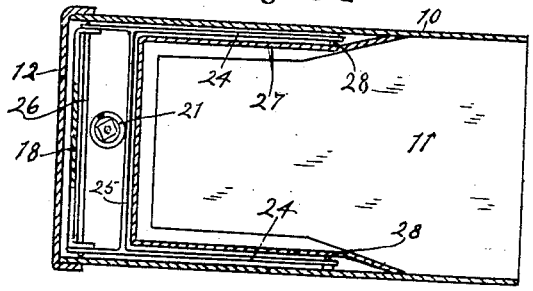

In the drawings, Figure 1 is a perspective view of the scoop from the viewpoint of the user. Fig. 2 is a central vertical longitudinal section thereof. Fig. 3 is a vertical section on a line 3 3 of Fig. 2. Fig. 4 is a perspective view of the handle plate and bars on which the scoop is mounted. Fig. 5 is a horizontal section on a line 5 5 of Fig. 2.

The scoop has side walls 10, a bottom 11, a rear wall 12, and a partition 13, that is parallel with the rear wall which provides a chamber 14 in the rear portion of the scoop. The scoop is horizontally disposed with the top and one end open like the ordinary grocer's scoop, so that it is convenient for digging in sugar and other material in the barrel and the like in scooping therefrom goods and the desired quantity and value.

The chamber 14 at the rear is a closed chamber with a vertical slot 15, through which the stem 16 of the handle 17 projects. The inner end of the handle-stem 16 has integral with it a handle-plate 18, that is vertically disposed, and the handle is horizontal, and about midway of the rear end of the scoop an arm 20 projects forward from the upper part of the plate 18, to which the upper end of the spring 21 is secured. The lower end of said spring 21 is mounted on an adjusting-screw 22 on the bottom of the scoop. From this it is seen that the scoop is vertically movable under a load with reference to the handle—that is, with a weight the scoop will move downward with relation to the handle.

In order that the scoop may move as a whole vertically when the handle is at the rear end, as herein shown, the two pairs of bars 24 are connected together in pairs by bars 25 and are pivoted at their rear ends to the handle-plate by rods 26 or any other pivoting means. The forward end of these bars 24 project into a chamber within the side walls of the scoop, formed by partitions 27, and are pivoted to the scoop on the pins 28.

The scoop and handle are locked together while the scoop is being inserted in the goods, to remove a scoop full, by the bolt 30, mounted within a casing 31, secured to the under side of the handle, and that is actuated by the spring 32, so that its inner end will engage a recess or hole 33 in the rear wall of the scoop, the part being recessed by the finger-piece 34, that extends downward from the scoop.

A scale-plate 35 is secured to the handle at a point adjacent to the rear wall of the scoop and covering the slot 15, so that said scale-plate is stationary, with relaton to the handle. Upon it there are vertically-disposed scales or graduations. The scales herein shown consist of a pound-scale 36 and a series of price-scales at certain prices per pound arranged parallel with the pound-scale and to the right. However, other scales or graduations may be employed, as desired, instead of what is herein shown. The prices per pound and "Lbs." are indicated at the upper ends of the various columns. An indicator 37 consists of a bar that is secured at each end to the rear wall of the scoop and extends about the scale-plate and has notches in it registering with the various scales. The scale-plate fits loosely between the rear wall of the scoop and said indicator 37.

Assuming that a customer wishes thirty-five cents worth of coffee at twenty cents per pound, the grocer, with the scoop locked, as shown in Fig. 2, dips the scoop into the bag or box of coffee and then releases the lock-bar 30 with a finger of the hand that holds the handle. The scoop will at once drop down relatively to the handle by reason of the weight. He then shakes out or removes enough coffee to cause the indicator to register with the numeral "35" in the "25c." column. In the same way he supplies goods of a certain weight to a customer.

This device is very simple so far as its scale construction is concerned, as the indicator is rigidly secured to the scoop and the scale is rigidly secured to the handle and is vertically arranged, so as to be immediately in front of the grocer while using the scoop.

What I claim as my invention, and desire to secure by Letters Patent, is—

1. The combination of a horizontally-disposed scoop, a horizontally-disposed handle at the rear end of the scoop, a spring-controlled means for mounting the handle in connection with the scoop so that the scoop will be movable vertically by gravity with relation to the handle, and a computing mechanism mounted in connection therewith, said computing mechanism consisting of a scale-plate provided with a suitable scale or graduations, and an indicator pointing to the graduations on the scale-plate, one part of said computing mechanism being secured to the handle and the other part to the scoop.

2. The combination of a horizontally-disposed scoop, a horizontally-disposed handle at the rear end of the scoop, a spring-controlled means for mounting the handle in connection with the scoop so that the scoop will be movable vertically by gravity with relation to the handle, a plate stationary with relation to the handle provided with a suitable scale or graduations, and an indicator mounted on the scoop and vertically movable with relation to said scale-plate.

3. The combination of a horizontally-disposed scoop, a horizontal handle at the rear end of the scoop, means carried by said handle to which the scoop is pivotally mounted between its ends so that it will move vertically with relation to the handle under the influence of gravity, a spring connected with the handle for supporting the scoop in its elevated position, a plate connected with the handle and provided with a suitable scale or graduations, and an indicator connected with the scoop and movable therewith and in relation to said scale-plate.

4. The combination of a horizontally-disposed scoop, a chamber at the rear end of the scoop having a vertical slot in its rear wall, a horizontally-disposed handle at the rear end of the scoop with a portion thereof projecting through said slot into said chamber, a handle-plate on the inner end of said handle and within said chamber, pairs of horizontal bars pivoted at their rear ends to said plate and at their front ends to the sides of the scoop, a spring connection between the scoop and said handle-plate, a scale-plate connected with the handle at the rear end of the scoop with a suitable scale or graduations thereon vertically disposed, and an indicator secured to the rear end of the scoop movable with relation to said scale-plate.

In witness whereof I have hereunto affixed my signature in the presence of the witnesses herein named.

BENJAMIN D. EMANUEL.

Witnesses:
HELEN B. MCCORD,
N. ALLEMONG.